(12) United States Patent
Morita et al.

(10) Patent No.: US 8,068,017 B2
(45) Date of Patent: Nov. 29, 2011

(54) CRIME-PREVENTION SYSTEM

(75) Inventors: Ryoko Morita, Osaka (JP); Kenichi Isoyama, Kyoto (JP); Koichi Iwamori, Osaka (JP); Hirofumi Yamaguchi, Osaka (JP); Mayumi Takimoto, Osaka (JP); Hitoshi Fujita, Osaka (JP)

(73) Assignee: Panasonic Corporation, Osaka (JP)

( * ) Notice: Subject to any disclaimer, the term of this patent is extended or adjusted under 35 U.S.C. 154(b) by 1129 days.

(21) Appl. No.: 11/802,959

(22) Filed: May 29, 2007

(65) Prior Publication Data

US 2007/0274576 A1 Nov. 29, 2007

(30) Foreign Application Priority Data

May 29, 2006 (JP) .................................. 2006-148093

(51) Int. Cl.
*G08G 1/00* (2006.01)
(52) U.S. Cl. ............. 340/426.1; 340/539.1; 340/539.11; 340/425.5
(58) Field of Classification Search ............. 340/825.36, 340/825.49, 539.1, 539.11, 425.5, 426.1
See application file for complete search history.

(56) References Cited

U.S. PATENT DOCUMENTS

| 5,973,611 | A * | 10/1999 | Kulha et al. | 340/5.62 |
| 7,548,491 | B2 * | 6/2009 | Macfarlane | 367/198 |
| 2003/0231550 | A1 * | 12/2003 | Macfarlane | 367/198 |

FOREIGN PATENT DOCUMENTS

| JP | 2004-224265 | 8/2004 |
| JP | 2005-011305 | 1/2005 |
| JP | 2006-185331 | 7/2006 |

* cited by examiner

*Primary Examiner* — Daryl Pope
(74) *Attorney, Agent, or Firm* — McDermott Will & Emery LLP

(57) ABSTRACT

A vehicle is provided with an identification information memory in which identification information of the vehicle is memorized, and a transmitter for transmitting the identification information. A portable terminal is provided with a receiver for receiving the identification information transmitted from the transmitter, a registration information memory in which identification information of a ridable vehicle is memorized as registration information in advance, and a controller for executing authentication between the identification information and the registration information and executing a warning processing when a result of authentication shows inconsistency.

19 Claims, 10 Drawing Sheets

Q4: registration information extraction request signal
Q5: contact address information extraction request signal Q1: identification information transmission request signal
Q2: identification information extraction request signal
Q3: identification information non-registration signal

CRIME-PREVENTION SYSTEM

BACKGROUND OF THE INVENTION

1. Field of the Invention

The present invention relates to a crime prevention system for notifying the occurrence of a crime in which a vehicle is used.

2. Description of the Related Art

In recent years, the number of stolen cars has been increased, and various systems in which a portable terminal is used for authentication of a vehicle driver have been proposed as a prevention measure. The theft prevention system for vehicle, for example, recited in No. 2004-224265 of the Japanese Patent Documents is constituted in such a manner that identification information of a portable telephone possessed by a driver is memorized on the vehicle side in advance, and identification information transmitted from the portable telephone and the memorized identification information are collated with each other on the vehicle side so that the vehicle is allowed to be used when the information are coincident with each other. Hereinafter, the foregoing example is referred to as the first conventional example.

FIG. 10 shows a constitution of an engine control computer provided in the vehicle of the first conventional example (theft prevention system for vehicle). An engine control computer 50 comprises an engine controller 51 for controlling an engine 60, a memory 52 in which identification information of a portable telephone 30 possessed by a driver is memorized in advance, a receiver 53 for receiving a position registration request signal transmitted from the portable telephone 30 to a base station of a telecommunication network, and a granter 54 for collating the identification information of the portable telephone 30 included in the position registration request signal and the identification information memorized in the memory 52 with each other and granting start-up of the engine 60 when the information is coincident with each other.

Meanwhile, crimes using a car are increased, and systems in which a portable terminal is used have been proposed in order to assure human safety. In the personal portable rescue request system, for example, recited in No. 2005-11305 of the Japanese Patent Documents, when a vehicle owner encounters some danger, a person presses an emergency button of a portable remote controller and transmits rescue request information using a radio portable telephone so that the safety of the vehicle owner is assured against any assailant. Hereinafter, the foregoing constitution is referred to as the second conventional example.

However, it is difficult to apply the first conventional example to a crime prevention system for notifying the occurrence of such a crime as kidnapping. The individual authentication in the first conventional example is not applicable to a portable telephone possessed by any fellow passenger in the vehicle other than the driver. Therefore, the constitution is unable to deal with the occurrence of such a crime as kidnapping.

Further, the management of the identification information used for authentication and the authenticating process itself are performed on the vehicle side, which leaves such a possibility that the identification information can be additionally registered on the vehicle side with malicious motives. As a result, there is still some problem in a security level.

Further, since the vehicle driver can be authenticated only when the engine starts, it is not possible to detect the vehicle theft after the engine started.

Meanwhile, in the second conventional example, the rescue cannot be requested when it is not possible to press the emergency button of the portable remote controller.

SUMMARY OF THE INVENTION

Therefore, a main object of the present invention is to provide a crime prevention system for authenticating a vehicle passenger when the vehicle is used, and automatically notifying the occurrence of any crime in which the passenger is involved.

A crime prevention system according to the present invention is a crime prevention system for authenticating a vehicle passenger via a portable terminal possessed by the vehicle passenger when the vehicle is used, wherein the vehicle is provided with:

an identification information memory in which identification information of the vehicle is memorized; and a transmitter for transmitting the identification information, and the portable terminal is provided with:

a receiver for receiving the identification information transmitted from the transmitter;

a registration information memory in which identification information of a ridable vehicle is memorized in advance as registration information; and a controller for executing authentication between the identification information and the registration information and executing a warning processing when authentication result shows inconsistency.

In the foregoing constitution, there is an embodiment that contact address for the authentication result is registered in advance in the registration information memory, and the controller transmits the warning to the contact address registered in the registration information memory when the authentication result shows the inconsistency.

In the foregoing constitution, the identification information of the relevant vehicle (production number, license plate and the like of the vehicle) is memorized in advance in the vehicle identification information memory. Further, the identification information of the ridable vehicle is memorized in advance as the registration information in the registration information memory in the portable terminal possessed by the vehicle passenger (driver or fellow passenger). When a door of the vehicle is opened or closed, when the door lock is released or locked, when a window of the vehicle is opened or closed, or when the vehicle starts or stops, the transmitter transmits the identification information in the identification information memory to the portable terminal. The vehicle passenger receives the identification information from the vehicle through the receiver of the portable terminal possessed by the vehicle passenger. Then, the controller of the portable terminal collates the received identification information with the registration information in the registration information memory (identification information of the ridable vehicle) to execute authentication. When the authentication result shows the inconsistency, the controller transmits a warning signal to the contact address registered in advance in the registration information memory and emits a warning sound so that an abnormal state is warned.

As just described, according to the present invention, the holder of the portable terminal of the relevant system, including not only the driver but also the fellow passenger, can be authenticated. As a result, the occurrence of such a crime as "kidnapping" by use of the car can be notified.

Further, the management of the registration information and the authentication are performed on the portable-telephone side, which eliminates such a risk that another identification information used for the authentication is additionally registered by the intention of a third party. As a result, a high security level can be assured.

The crime prevention system according to the present invention authenticates the holder of the portable terminal of the relevant system, which includes not only the driver but also the fellow passenger. As a result, the occurrence of such a crime as "kidnapping" by use of the car can be notified. Therefore, the system is advantageous as a system providing security-related information.

BRIEF DESCRIPTION OF THE DRAWINGS

These and other objects as well as advantages of the invention will become clear by the following description of preferred embodiments of the invention. A number of benefits not recited in this specification will come to the attention of those skilled in the art upon the implementation of the present invention

DETAILED DESCRIPTION OF THE INVENTION

Figure 1:
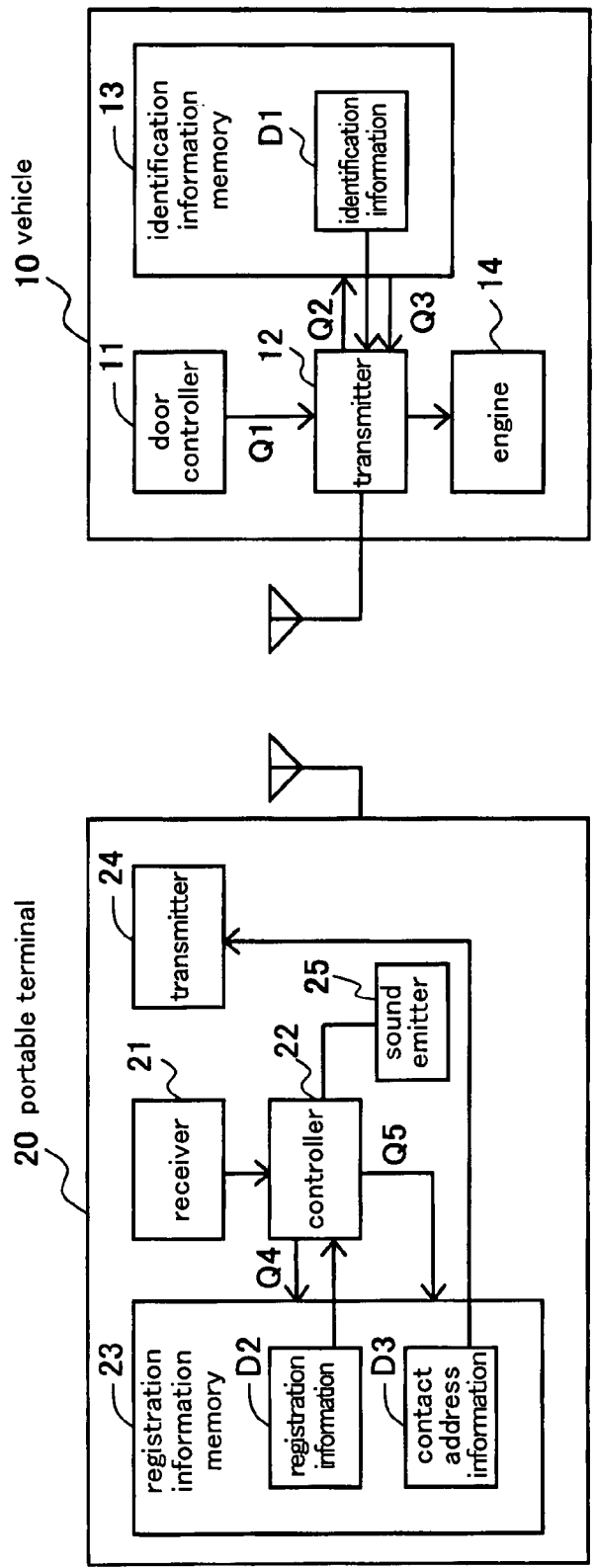
FIG. 1 is a block diagram showing a constitution of a crime prevention system according to the present invention.

Hereinafter, a preferred embodiment of a crime prevention system according to the present invention is described referring to the drawings. FIG. 1 is a block diagram showing a constitution of a crime prevention system according to the present invention. The crime prevention system according to the present invention is constituted as a combination of a vehicle 10 and a portable terminal 20.

The vehicle 10 comprises a door controller 11, a transmitter 12, an identification information memory 13, and an engine 14. The door controller 11 transmits identification information D1 of the vehicle memorized in advance in the identification information memory 13 from the transmitter 12 to the portable terminal 20 when it is detected that a door of the vehicle 10 is opened. The door controller 11 controls the operation of the doors of the vehicle 10. When it is detected that the door is opened, the door controller 11 outputs an identification information transmission request signal Q1 to the transmitter 12. The transmitter 12 transmits the identification information D1 used for authentication toward the portable terminal 20. Upon the reception of the identification information transmission request signal Q1 from the door controller 11, the transmitter 12 outputs an identification information extraction request signal Q2 to the identification information memory 13 and obtains the identification information D1 from the identification information memory 13, and then, transmits the obtained identification information D1 to the portable terminal 20. Further, the transmitter 12 prohibits the start-up of the engine 14 when an identification information non-registration signal Q3 is received from the identification information memory 13. The identification information memory 13 memorizes the identification information D1 of the vehicle 10 in advance. When the identification information memory 13 receives the identification information extraction request signal Q2 from the transmitter 12, it confirms the identification information D1 memorized therein. Then, the identification information memory 13 transmits the memorized identification information D1 to the transmitter 12 in the case where the identification information D1 is correctly memorized, while outputting the identification information non-registration signal Q3 to the transmitter 12 in the case where the identification information D1 is not memorized therein. The identification information D1 is information that can identify the production number, license plate or the like of the vehicle 10.

The portable terminal 20 comprises a receiver 21, a controller 22, a registration information memory 23, a transmitter 24, and a sound emitter 25. When the identification information D1 transmitted by the vehicle 10 is received by the receiver 21, the controller 22 executes authentication to the registration information D2 memorized in advance in the registration information memory 23 and the identification information D1, and transmits warning information from the transmitter 24 based on a contact address information D3 registered in advance in the registration information memory 23 when the identification D1 and the registration information D2 are inconsistent with each other as authentication result. The receiver 21 receives the identification information D1 transmitted from the transmitter 12 of the vehicle 10. When the receiver 21 receives the identification information D1 from the vehicle 10, the receiver 21 transmits the received identification information D1 to the controller 22. The registration information memory 23 previously memorizes the identification information of the ridable vehicle as the registration information D2 and the contact address when the authentication fails as the contact address information D3. The registration information memory 23 transmits the registration information D2 to the controller 22 upon the reception of the registration information extraction request signal Q4 from the controller 22, and transmits the contact address information D3 to the transmitter 24 upon the reception of a contact address information extraction request signal Q5 from the controller 22. The controller 22 executes authentication to the identification information D1 and the registration information D2, and performs the processing in compliance with the authentication result. When the controller 22 receives the identification information D1 from the receiver 21, the controller 22 outputs the registration information extraction request signal Q4 to the registration information memory 23. Further, when the controller 22 obtains the registration information D2 from the registration information memory 23, the controller 22 executes authentication to the obtained registration information D2 and the identification information D1. Then, the controller 22 outputs the contact address information extraction request signal Q5 to the registration information memory 23 when the registration information D2 and the identification information D1 are inconsistent with each other as the authentication result. The registration information D2 is the identification information of the vehicle to which the holder of the portable terminal 20 can ride, and memorized in the registration information memory 23 in advance. The registration information D2 is the information transmitted from the registration information memory 23 to the controller 22 when the registration information memory 23 receives the registration information extraction request signal Q4 from the controller 22. The controller 22 executes the authentication based on the received registration information D2. The contact address information D3 is information such as a telephone number of the contact address notified when the authentication failed in the controller 22 and memorized in advance in the registration information memory 23. When the registration information memory 23 receives the contact address information extraction request signal Q5 from the controller 22, the registration information memory 23 transmits the contact address information D3 to the transmitter 24. The transmitter 24 transmits the warning based on the received contact address information D3. The transmitter 24 transmits the warning information based on the contact address information D3 received from the registration information memory 23 when the authentication to the identification information D1 and the registration information D2 failed in the controller 22. The sound emitter 25 emits the warning sound based on the instruction from the controller 22.

Figure 2:
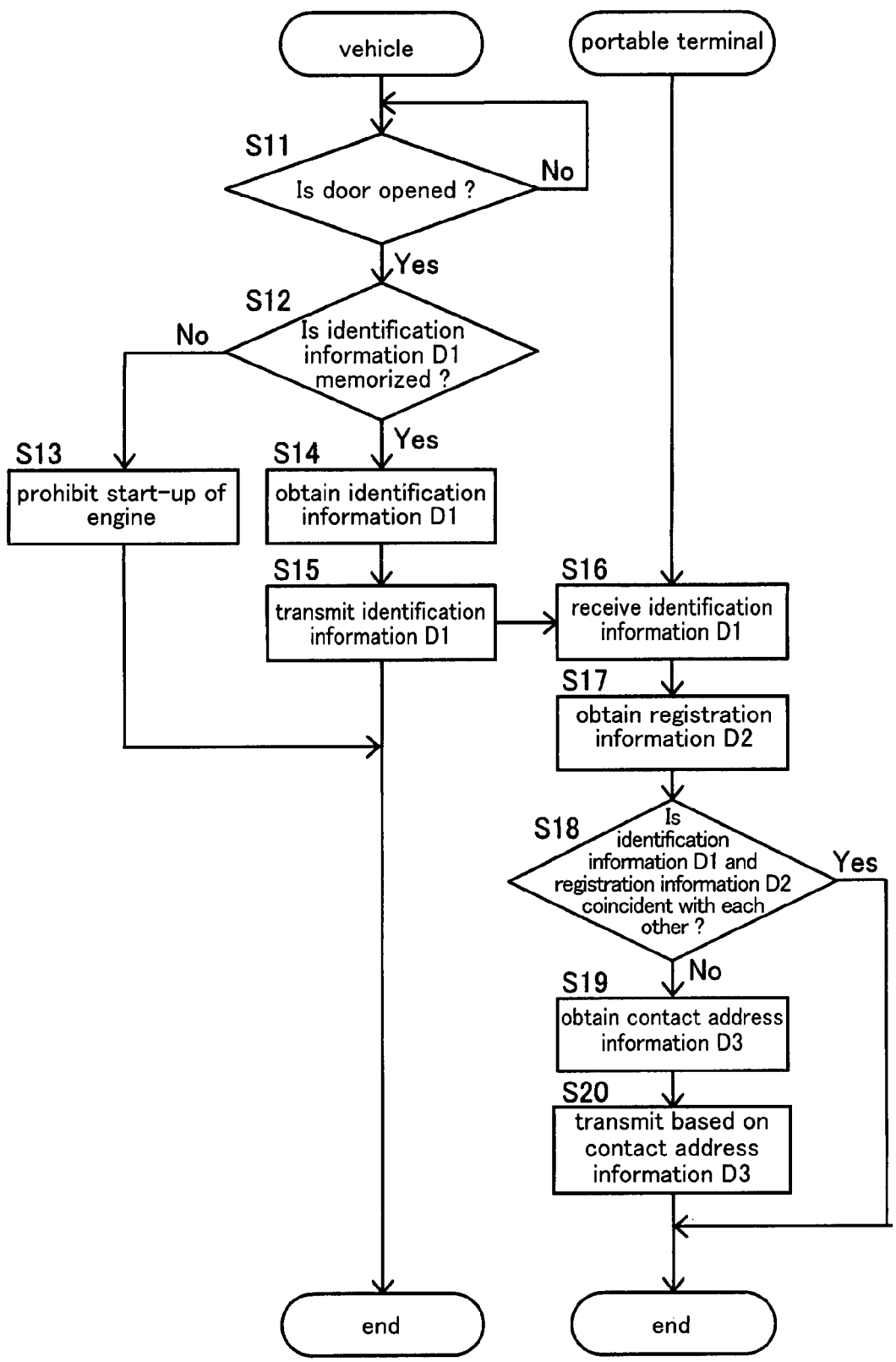
FIG. 2 is a flow chart illustrating a general operation of a crime prevention system according to a preferred embodiment of the present invention.

FIG. 2 is a flow chart showing a general operation of the crime prevention system according to the present invention. In the vehicle 10, when the door controller 11 detects that the door is opened (Yes in S11), the identification information memory 13 confirms whether the identification information D1 is memorized therein (S12). In the case where the identification information D1 is not memorized in the identification information memory 13 (No in S12), the transmitter 12 prohibits the start-up of the engine (S13) so that the vehicle 10 cannot be used because there is a possibility that the vehicle 10 may be illegally used. Here, it is based on the assumption that a regular driver would surely register the identification information D1 in the identification information memory 13 in advance.

On the other hand, in the case where the identification information D1 is memorized in the identification information memory 13 (Yes in S12), the transmitter 12 obtains the identification information D1 from there (S14), and transmits the obtained identification information D1 to the portable terminal 20 (S15). When the receiver 21 receives the identification information D1 from the vehicle 10 in the portable terminal 20 (S16), the controller 22 obtains the registration information D2 from the registration information memory 23 (S17). The controller 22 executes the operation described above, and then, performs authentication to the identification information D1 and the registration information D2 (S18). When it is judged that the information is not coincident with each other in the authenticating process, the holder of the portable terminal 20 is riding the vehicle 10 not allowed to ride, which leads to the possibility to be involved in any crime in which the vehicle 10 is used. In such a case, the controller 22 obtains the contact address information D3 from the registration information memory 23 (S19) and transmits the warning to the contact address based on the contact address information D3 (S20) so as to notify a possibility on occurrence of the crime.

Figure 3:
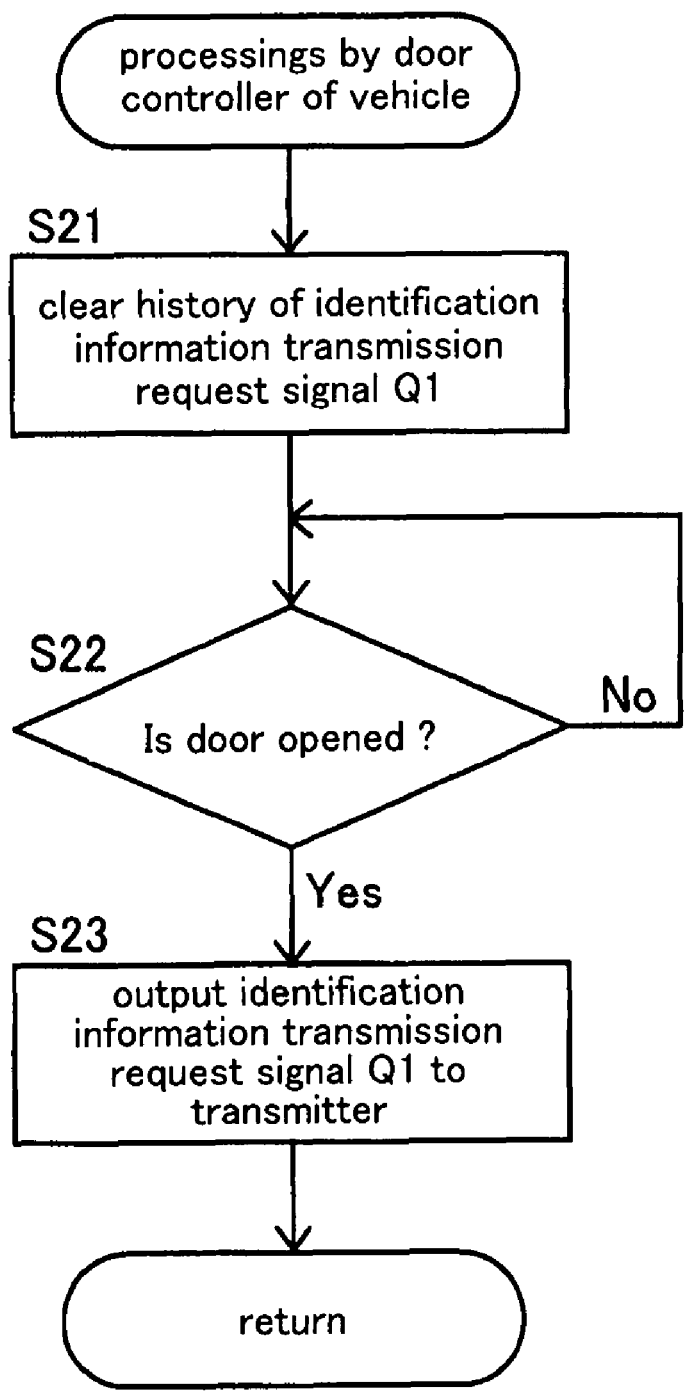
FIG. 3 is a flow chart illustrating processing executed by a door controller of a vehicle according to the preferred embodiment.

FIG. 3 is a flow chart showing processing executed by the door controller 11 of the vehicle 10. First, the door controller 11 clears any record of the output of the identification information transmission request signal Q1 (S21), and then, judges whether the door is opened (S22). When it is judged that the door is opened (Yes in S22), the door controller 11 outputs the identification information transmission request signal Q1 to the transmitter 12 (S23).

Figure 4:
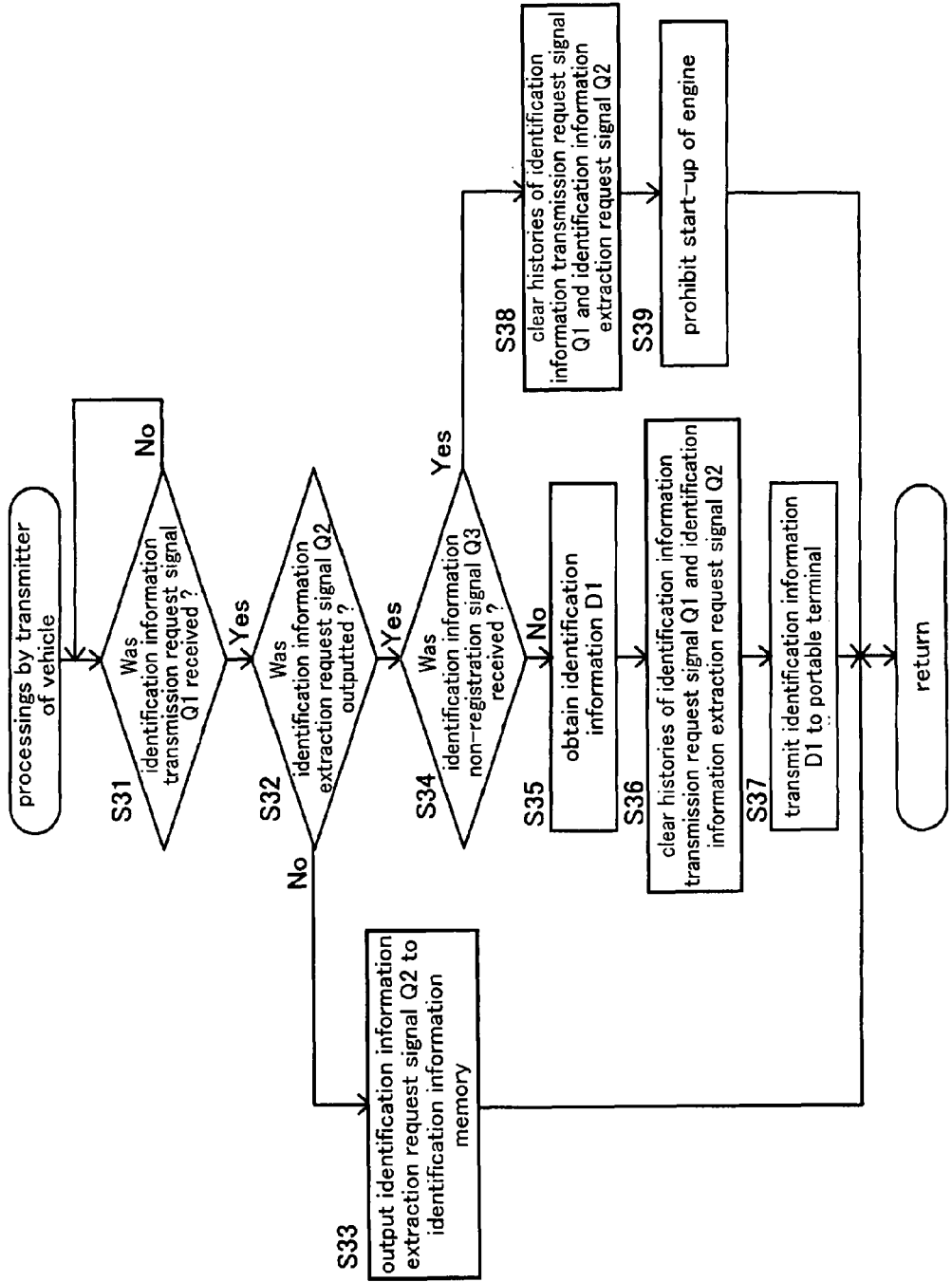
FIG. 4 is a flow chart illustrating processing executed by a transmitter of the vehicle according to the preferred embodiment.

FIG. 4 is a flow chart showing processing executed by the transmitter 12 of the vehicle 10. When the confirmation is made on the reception of the identification information transmission request signal Q1 from the door controller 11 (Yes in S31), the transmitter 12 confirms whether there is any history of the output of the identification information extraction request signal Q2 (S32). In the absence of the history of the output of the identification information extraction request signal Q2 (No in S32), the transmitter 12 outputs the identification information extraction request signal Q2 to the identification information memory 13 (S33). Processing after S33 are executed according to S41→S42 in a flow chart described later referring to FIG. 5.

Meanwhile, in the case where there is the history of the output of the identification information extraction request signal Q2 (Yes in S32), it is confirmed whether the identification information non-registration signal Q3 was received (S34). In the case where the identification information non-registration signal Q3 was not received (No in S34), the transmitter 12 obtains the identification information D1 (S35), clears the histories of the identification information transmission request signal Q1 and the identification information extraction request signal Q2 (S36), and transmits the identification information D1 to the portable terminal 20 (S37). The foregoing processing (S35→S37) correspond to the processing in S14→S15 in the flow chart shown in FIG. 2. The processing after S35→S37 becomes S51→S52 in a flow chart described later referring to FIG. 6.

In the case where the identification information non-registration signal Q3 was received (Yes in S34), there is a possibility that the vehicle 10 is illegally used. Therefore, the transmitter 12 clears the histories of the identification information transmission request signal Q1 and the identification information extraction request signal Q2 (S38) and prohibits the start-up of the engine (S39). The foregoing processing (S38→S39) correspond to the processing in S12→S13 in the flow chart shown in FIG. 2.

Figure 5:
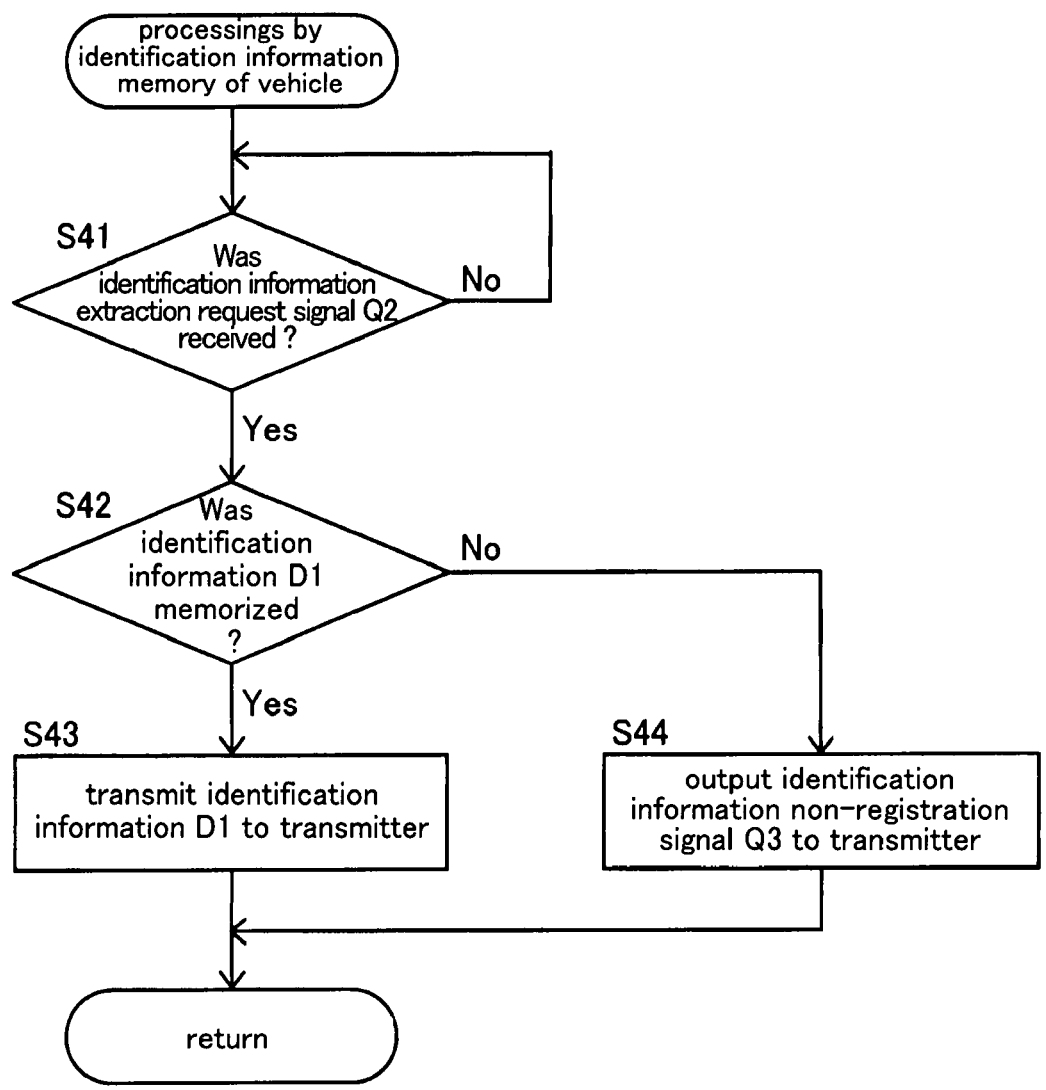
FIG. 5 is a flow chart illustrating processing executed by an identification information memory of the vehicle according to the preferred embodiment.

FIG. 5 is a flow chart showing processing executed by the identification information memory 13 of the vehicle 10. When the confirmation is made on the reception of the identification information extraction request signal Q2 from the transmitter 12 (Yes in S41), the identification information memory 13 confirms whether the identification information D1 is correctly memorized therein in advance (S42). The processing in S42 corresponds to the processing in S12 in the flow chart shown in FIG. 2. When it is judged that the identification information D1 is memorized (Yes in S42), the identification information memory 13 transmits the identification information D1 to the transmitter 12 (S43). The processing after S43 becomes S35→S36→S37 shown in the flow chart of FIG. 4. When it is judged that the identification information D1 is not memorized (No in S42), the identification information memory 13 transmits the identification information non-registration signal Q3 to be transmitter 12 (S44). The processing after S44 becomes S34→S38→S39 shown in the flow chart of FIG. 4.

Figure 6:
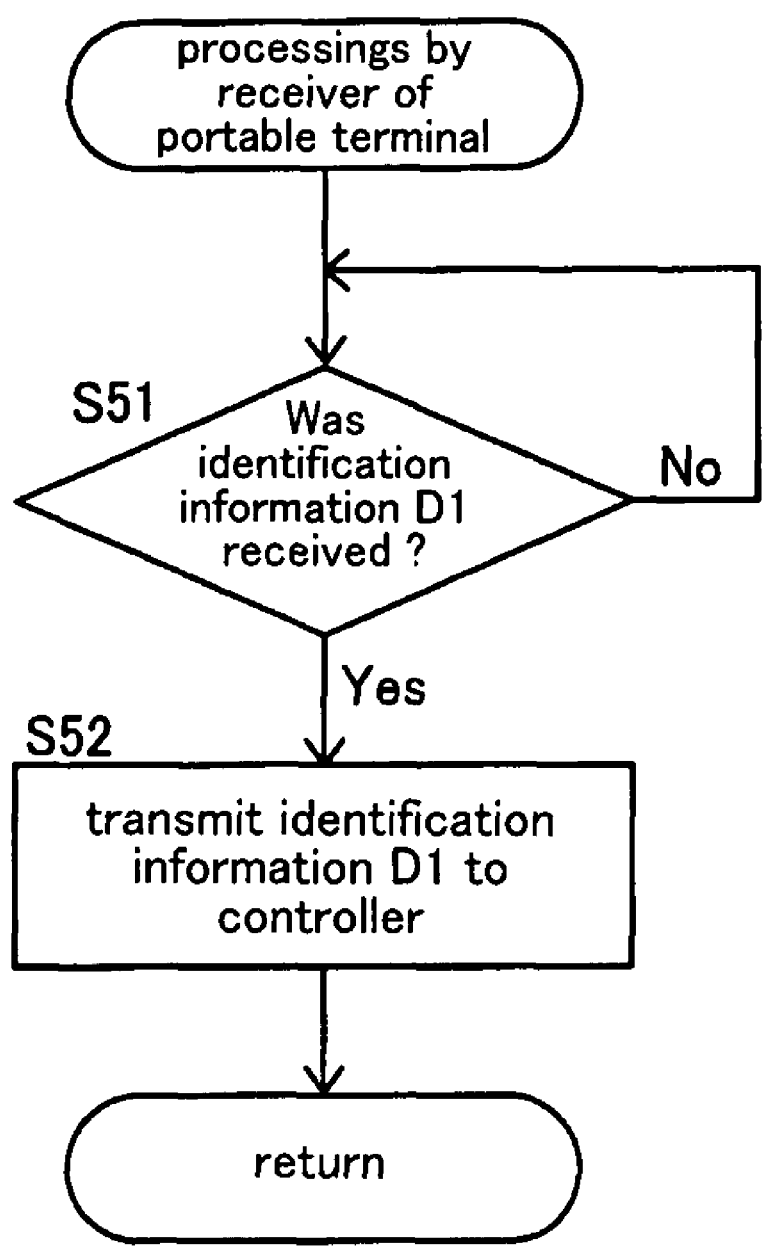
FIG. 6 is a flow chart illustrating processing executed by a receiver of a portable terminal according to the preferred embodiment.

FIG. 6 is a flow chart showing processing executed by the receiver 21 of the portable terminal 20. Upon the reception of the identification information from the vehicle 10 (Yes in S51), the receiver 21 transmits the received identification information D1 to the controller 22 (S52). The processing in S52 corresponds to the processing in S16→S17 in the flow chart shown in FIG. 2. The processing after S52 becomes S72→S73 shown in a flow chart of FIG. 8.

Figure 7:
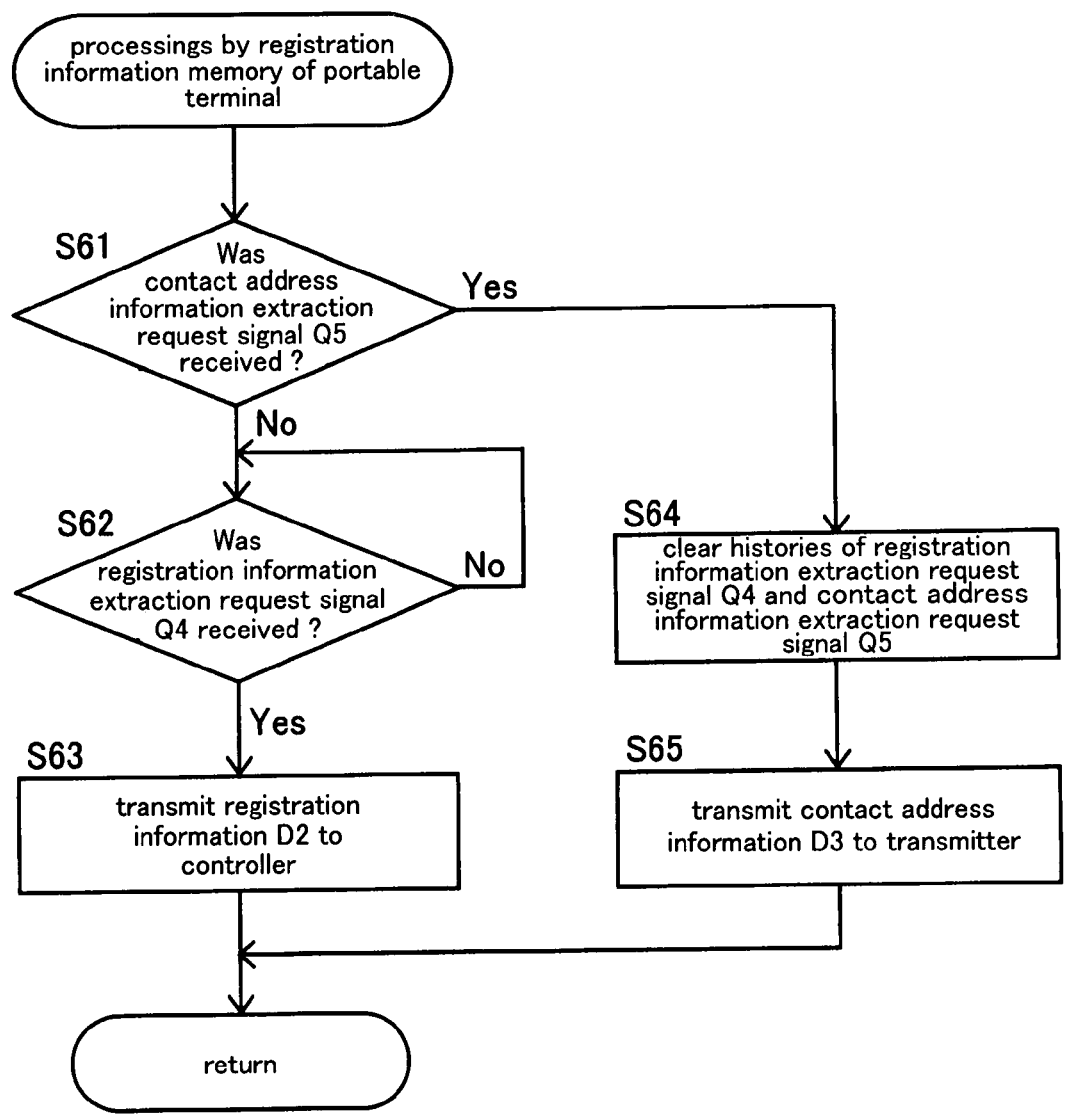
FIG. 7 is a flow chart illustrating processing executed by a registration information memory of the portable terminal according to the preferred embodiment.

FIG. 7 is a flow chart showing processing executed by the registration information memory 23 of the portable terminal 20. The registration information memory 23, first, confirms whether the contact address information extraction request signal Q5 was received in order to discriminate the destination of the information and the information to be transmitted (S61). In the case where the contact address information extraction request signal Q5 was not received (No in s61), there is no history of the transmission of the registration information D2. Then, the registration information memory 23 confirms whether the registration information extraction request signal Q4 was received from the controller 22 (S62). In the case where the registration information extraction request signal Q4 was received (Yes in S62), the registration information memory 23 transmits the registration information D2 to the controller 22 (S63). The processing in S63 is followed by S74→S75 S77 shown in the flow chart of FIG. 8 described later. The processing after S63 becomes S71→S74 shown in the flow chart of FIG. 8.

Figure 8:
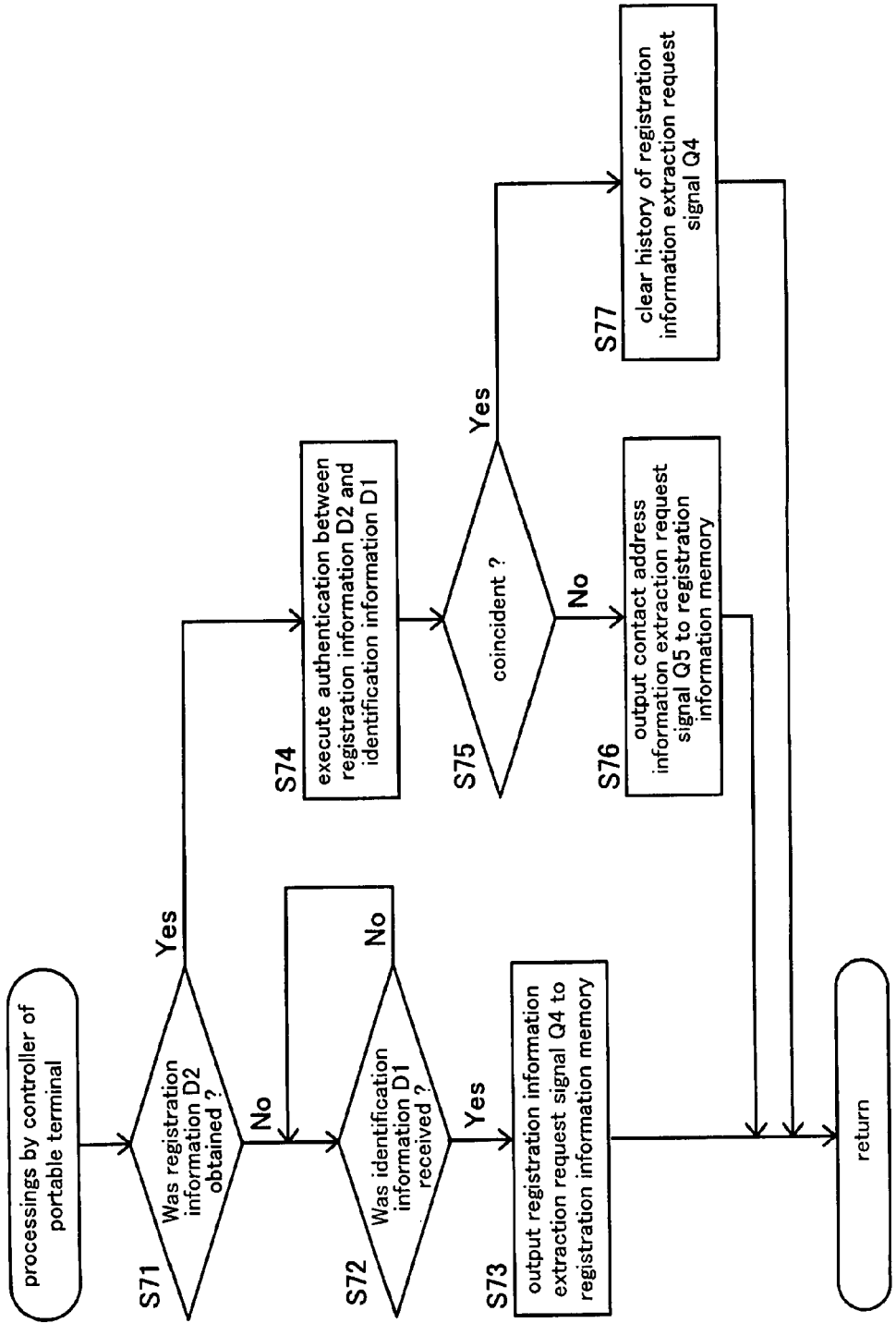
FIG. 8 is a flow chart illustrating processing executed by a controller of the portable terminal according to the preferred embodiment.

On the other hand, the processing in the case where the contact address information extraction request signal Q5 was received (Yes in S61) is followed by S76 in the flow chart shown in FIG. 8. In this case, the transmission of the contact address information D3 that includes the history of the output of the registration information D2 is requested. Therefore, the histories of the registration information extraction request signal Q4 and the contact address information extraction request signal Q5 outputted by the controller 22 are cleared (S64), and the contact address information is transmitted to the transmitter 24 (S65). The processing after S64→S65 becomes S81→S82 shown in a flow chart of FIG. 9 described later.

FIG. 8 is a flow chart showing processing executed by the controller 22 of the portable terminal 20. The controller 22 confirms whether the registration information D2 was obtained and judges a kind of the information requested to the registration information memory 23 (S71). In the case where the registration information D2 was not obtained (No in S71), the controller 22 confirms whether the identification information D1 was received (S72). In the case where the identification information D1 was received (Yes in S72), the controller 22 outputs the registration information extraction request signal Q4 to the registration information memory 23 (S73). The processing after S73 becomes S62→S63 shown in the flow chart of FIG. 7.

On the other hand, in the case where the registration information D2 was obtained (Yes in S71), the controller 22 executes authentication to the registration information D2 and the identification information D2 (S74 and S75). When it is judged from a result of authentication that the information are coincident with each other (Yes in S75), the holder of the portable terminal 20 can ride the vehicle 10, and the controller 22 then clears the history of the registration information extraction request signal Q4 (S77).

When it is judged from the authentication result that the information are not coincident with each other (No in S75), the holder of the portable terminal 20 cannot ride the vehicle 10, and the controller 22 then outputs the contact address information extraction request signal Q5 to the registration information memory 23 (S76). The processing after S74→S77 described above becomes S61→S64→S65 shown in the flow chart of FIG. 7.

Figure 9:
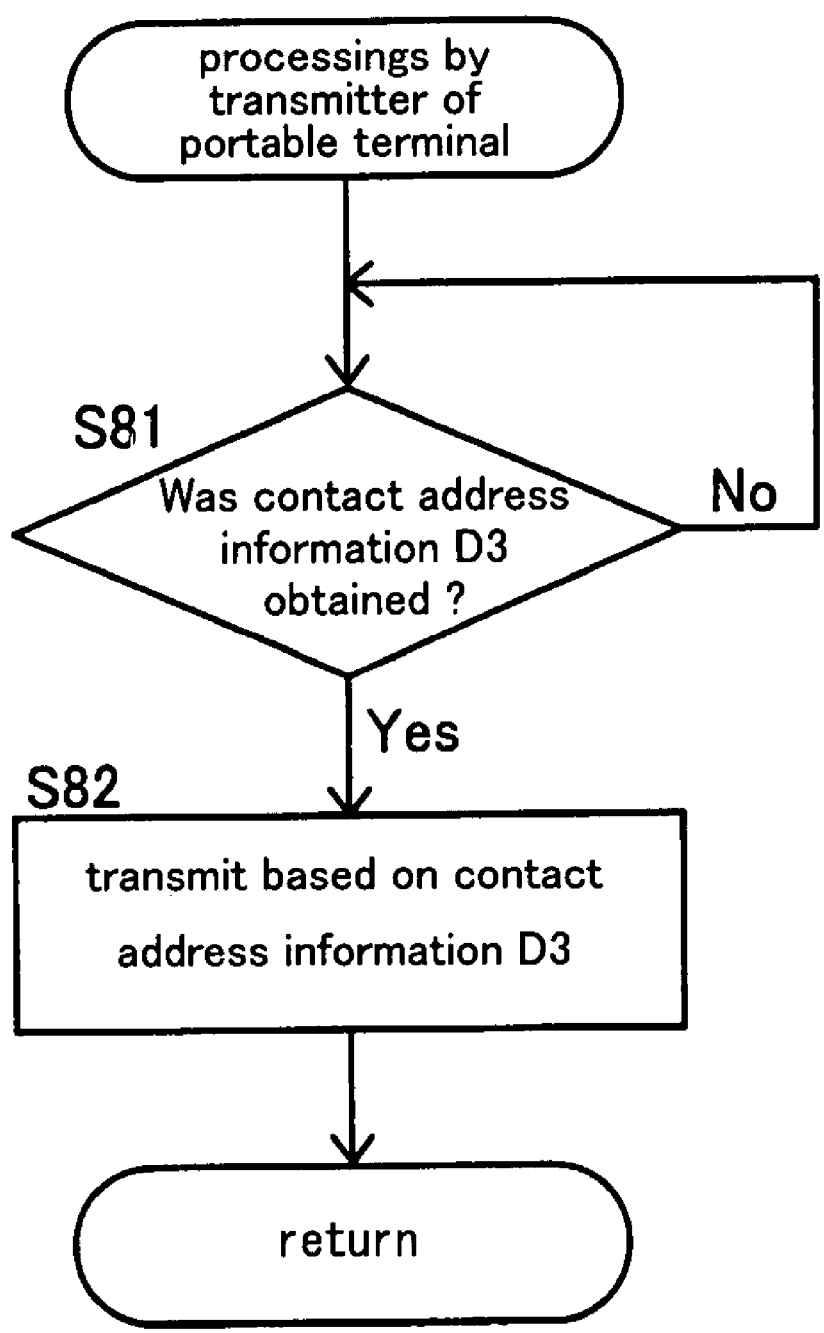
FIG. 9 is a flow chart illustrating processing executed by a transmitter of the portable terminal according to the preferred embodiment.
Figure 10:
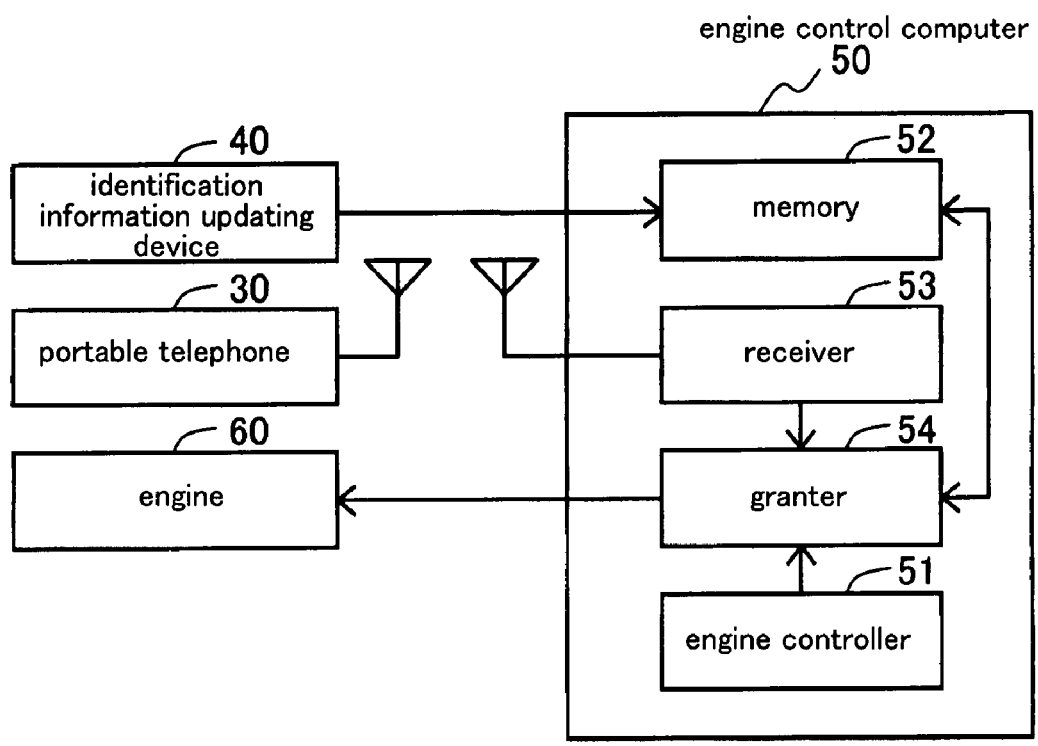
FIG. 10 is a block diagram showing a constitution of an engine control computer of a vehicle theft prevention system according to a conventional technology.

FIG. 9 is a flow chart showing processing executed by the transmitter 24 of the portable terminal 20. The transmitter 24 obtains the contact address information D3 from the registration information memory 23 (Yes in S81), and then, transmits the warning information based on the contact address information D3 (S82).

As above stated, according to the present preferred embodiment, authentication with high level of security can be made to the holder of the portable terminal of the relevant system including not only the driver of the vehicle but also the fellow passenger. As a result, the occurrence of such a crime as kidnapping by use of a vehicle can be notified.

Furthermore, the present invention is not limited to the foregoing preferred embodiment. For example, in the foregoing preferred embodiment, output timing of the identification information transmission request signal Q1 to the transmitter 12 is made to be at the time when the door of the vehicle is opened, and the detection of the output timing is set in the door controller 11. However, the output timing is made to be at the time when the door of the vehicle is shut, and then the detection of the output timing may be set in the door controller 11. Additionally, a tire controller is provided so that output timing of the identification information transmission request signal Q1 is made to be at the time when the vehicle starts or stops, and thereafter the detection of the output timing may be set in the tire controller. Furthermore, a key controller is provided so that output timing of the identification information transmission request signal Q1 is made to be at the time when the door key of the vehicle is locked or released, and the detection of the output timing may be set in the key controller. Moreover, a window controller is provided so that output timing of the identification information transmission request signal Q1 is made to be at the time when the window of the vehicle is opened or closed, and the detection of the output timing may be set in the window controller.

In the foregoing preferred embodiment, the processing in the case of failing in authentication is set as below. That is, the controller 22 outputs the contact address information extraction request signal Q5 to the registration information memory 23, and the transmitter 24 transmits the warning information based on the contact address information D3 received from the registration information memory 23 when the authentication fails. However, the controller 22 may output a warning sound generation request signal to the sound emitter 25 so that the sound emitter 25 emits the warning sound when the authentication fails.

Additionally, in the foregoing preferred embodiment, the processing in the case where the identification information D1 is not memorized in the identification information memory 13 of the vehicle is made to be at the time when the start-up of the engine is prohibited, however, such a processing other than the above one that the vehicle may be set to an unusable state may be employed.

Though preferred embodiments of this invention has been described in detail, it will be understood that various modifications may be made therein, and it is intended to cover in the appended claims all such modifications as fall within the true spirit and scope of this invention.

What is claimed is:

1. A crime prevention system for authenticating a vehicle passenger via a portable terminal carried by the vehicle passenger when the vehicle is used, wherein:
the vehicle is provided with:
an identification information memory in which identification information of the vehicle is memorized; and
a transmitter for transmitting the identification information, and the portable terminal is provided with:

a receiver for receiving the identification information transmitted from the transmitter;

a registration information memory in which identification information of a ridable vehicle is memorized as registration information in advance; and a controller for executing authentication between the identification information and the registration information when the vehicle passenger is within the vehicle, and executing a warning processing when a result of authentication shows inconsistency.

2. The crime prevention system as claimed in claim 1, wherein contact address for the authentication result is registered in advance in the registration information memory, and the controller transmits a warning to the contact address registered in the registration information memory when the authentication result shows the inconsistency.

3. The crime prevention system as claimed in claim 1, wherein the portable terminal is provided with a sound emitter, and the controller makes the sound emitter emit a warning sound when the authentication result shows the inconsistency.

4. The crime prevention system as claimed in claim 1, wherein the identification information is a production number or a license number of the vehicle.

5. The crime prevention system as claimed in claim 1, wherein the transmitter transmits the identification information upon detecting that a door of the vehicle is opened or closed.

6. The crime prevention system as claimed in claim 1, wherein the transmitter transmits the identification information upon detecting that a door key of the vehicle is locked or released.

7. The crime prevention system as claimed in claim 1, wherein the transmitter transmits the identification information upon detecting that a window of the vehicle is opened or closed.

8. The crime prevention system as claimed in claim 1, wherein the transmitter transmits the identification information upon detecting that the vehicle started or stopped.

9. A vehicle for authenticating a vehicle passenger via a portable terminal carried by the vehicle passenger when the vehicle passenger is in the vehicle, the vehicle including:

an identification information memory in which identification information of the vehicle is memorized; and a transmitter for transmitting the identification information to the portable terminal for authenticating that the vehicle passenger carrying the portable terminal who is in the vehicle is allowed to ride the vehicle as a passenger by using the identification information.

10. A portable terminal for authenticating a vehicle passenger via the portable terminal carried by the vehicle passenger when the vehicle passenger is in the vehicle, the portable terminal including:

a receiver for receiving the identification information transmitted from a transmitter disposed in the vehicle;

a registration information memory in which identification information of a ridable vehicle is memorized as registration information in advance; and a controller for executing authentication between the identification information and the registration information when the vehicle passenger is within the vehicle, and executing a warning processing when a result of authentication shows inconsistency.

11. The crime prevention system as claimed in claim 1, wherein the vehicle passenger is a passenger and not a driver.

12. The vehicle as claimed in claim 9, wherein the vehicle passenger is a passenger and not a driver.

13. The portable terminal as claimed in claim 10, wherein the vehicle passenger is a passenger and not a driver.

14. The vehicle as claimed in claim 9, wherein the transmitter transmits the identification information upon detecting that a door of the vehicle is opened or closed.

15. The vehicle as claimed in claim 9, wherein the transmitter transmits the identification information upon detecting that a door key of the vehicle is locked or released.

16. The vehicle as claimed in claim 9, wherein the transmitter transmits the identification information upon detecting that a window of the vehicle is opened or closed.

17. The vehicle as claimed in claim 9, wherein the transmitter transmits the identification information upon detecting that the vehicle started or stopped.

18. The portable terminal as claimed in claim 10, wherein:

contact address for the authentication result is registered in advance in the registration information memory, and the controller transmits a warning to the contact address registered in the registration information memory when the authentication result shows the inconsistency.

19. The portable terminal as claimed in claim 10, wherein:

the portable terminal is provided with a sound emitter, and the controller makes the sound emitter emit a warning sound when the authentication result shows the inconsistency.

* * * * *